April 4, 1939.    P. RUFFINO    2,153,341
BRAKE LINING
Original Filed March 22, 1935
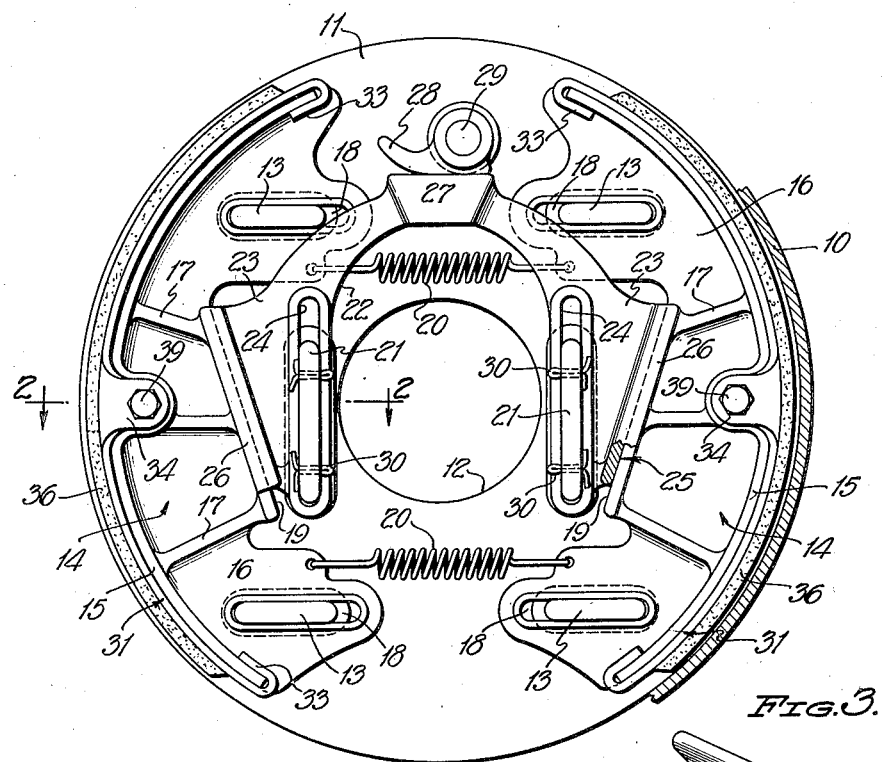
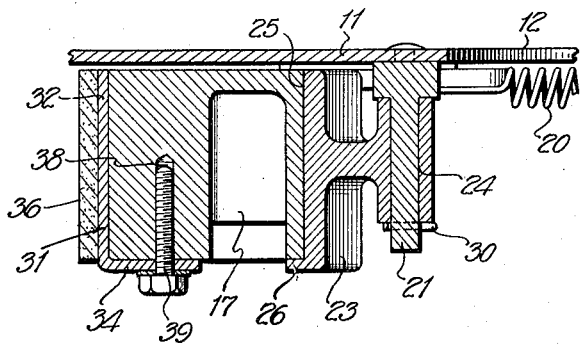
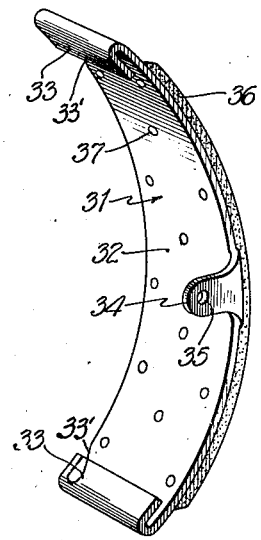
PETER RUFFINO.
INVENTOR.
BY Ely & Pattison
ATTORNEYS.

Patented Apr. 4, 1939

2,153,341

UNITED STATES PATENT OFFICE 2,153,341

BRAKE LINING

Peter Ruffino, Brooklyn, N. Y.

Original application March 22, 1935, Serial No. 12,345, now Patent No. 2,100,174, dated November 23, 1937. Divided and this application March 26, 1937, Serial No. 133,146

1 Claim. (Cl. 188—234)

This application is a divisional application of my prior Patent No. 2,100,174, dated November 23, 1937 and the invention relates to improvements in brake lining and fastening means therefor.

One of the main features of this invention is to provide a readily removable brake lining to the brake shoe of an automobile brake to expedite the replacement thereof when worn.

Another feature resides in a brake lining which may be applied to or removed from a brake shoe without disturbing the brake shoe relative to its assembled operative position upon its support.

A still further object of the invention is the provision of a brake lining which is simple and inexpensive of construction, easy to apply to or remove from a brake shoe, and which remains firmly in position upon a brake shoe in spite of the circumferential force to which it is subjected to when in use.

With these and other objects in view, the invention resides in the certain novel construction, combination and arrangement of parts, the essential features of which are hereinafter fully described in the following specification, are particularly pointed out in the appended claims, and are illustrated in the accompanying drawing, in which:

Figure 1 is a side elevational view of a brake mechanism equipped with my improved brake lining.

Figure 2 is an enlarged detail horizontal sectional view on the line 2—2 of Figure 1.

Figure 3 is a perspective view of one of my improved brake lining units per se.

Referring to the drawing by reference characters, the numeral 10 designates a portion of the brake drum of an automobile which is adapted to be fixedly attached to the wheel for rotation therewith, while closing the open side of the drum 10 is a flat disk-like anchor plate 11 which is adapted to be fixedly secured to the axle housing of an automobile. The center of the plate 11 is provided with an opening 12 for the passage of the axle.

Extending inwardly from the plate 11 on opposite sides of the vertical axis thereof are sets of upper and lower elongated posts 13, the same being horizontally disposed. The respective sets of posts 13 slidably support diametrically opposed brake shoes 14, and in view of the fact that the brake shoes 14 are identical in construction, a description of one will suffice for the other.

Each brake shoe 14 includes an arcuate shaped flange 15 from which an angular flange or web 16 extends, the said web extending inwardly from the inner edge of the arcuate flange 15 and is reinforced by transversely disposed ribs 17. The web 16 is provided with upper and lower elongated slots 18, of a length greater than the guide post 13 and which receive the respective posts 13 whereby the brake shoe is slidably supported for movement horizontally to an expanded or retracted position. The web 16 centrally thereof is provided with a downwardly and inwardly inclined face 19 of a width slightly less than the width of the arcuate flange 15.

From the description thus far, it will be seen that the two brake shoes 14—14 when slidably supported upon the guide posts 13 are diametrically opposed and they are normally urged to a retracted position by springs 20, the ends of which respectively connect with the webs 16 of the respective brake shoes. The elongated guide posts 13 serve to limit the sliding movement of the brake shoes both to retracted and expanded position.

Fixed to and extending inwardly from the anchor plate 11 are spaced parallel elongated guide posts 21—21, the said posts being respectively disposed on opposite sides of the opening 12. Slidable on the posts 21 is an expanding wedge member 22, the said member 22 being of substantially yoke or inverted U-shape as shown in Figure 1, the legs 23 of which are provided with vertical elongated slots 24 for receiving the elongated post 21. The outer sides of the legs 23 are enlarged in thickness and are provided with downwardly and inwardly extending wedge surfaces 25 for respective engagement with the wedge surfaces 19 of the brake shoes. The wedge portions of the legs 23 are provided with an outside flange 26 for engaging the sides of the respective wedge surfaces 19 of the brake shoes. The intermediate or bight portion of the wedge member 22 is provided with a widened head 27, the top of which is flat and is engaged by a cam 28 fixedly secured to the inner end of a shaft 29 journaled in the anchor plate 11 and which shaft is adapted to be operatively connected with the brake actuating mechanism of an automobile (not shown). The wedge member 22 may be inserted into position by sliding the same over the post 21 and when in the position shown in Figure 1, cotter pins 30 are inserted transversely through openings provided in the post 21 for retaining the member 22 in position.

Each brake shoe 14 removably supports a brake lining unit 31, shown per se in Figure 3 of the drawing. Each brake lining unit 31 includes a metal arcuate shaped member 32, the ends of which are turned inwardly to provide preformed hook portions 33. The hooked ends of the arcuate shaped member 32 have notches 33' on their inner sides to accommodate the web 16 of the brake shoe 14. The intermediate portion of the member 32 is formed with an inwardly extending ear 34 having an opening 35 therein for a purpose to be presently explained. Fixedly secured to the outside of the arcuate shaped member 32 is a layer of lining material 36, the same being fastened in position by rivets or like fastening elements 37. The ends of the lining material 36 terminate adjacent the hook ends 33 of the member 32.

The lining unit 31 is inserted laterally upon each of the brake shoes 14, the hook ends 33 engaging the ends of the arcuate flange 15 of the shoe, while the opening 35 in the ear 34 registers with a threaded opening 38 provided in the flange 16 while a threaded bolt 39 threads into the threaded opening 38 and secures the brake lining unit in position against lateral movement. The hook ends 33 serve to prevent creeping of the liner unit in a circumferential direction. It will be noted that when the lining material 36 becomes worn, the lining unit 31 may be removed by merely removing the bolt 39 and sliding the unit from the brake shoe, whereupon the worn unit may be replaced by a new one.

In the operation of the brake mechanism hereinbefore described, it will be observed that the springs 20—20 serve to normally hold the brake shoes in a retracted position, whereupon the wedge member 22 is in an up or raised position. In order to expand the brake shoes, the shaft 29 is turned by the brake operating mechanism and the cam 28 forces downwardly upon the head 27 of the member 22, causing the wedge faces 25 to wedgingly engage the wedge surfaces 19 on the brake shoes. This wedging action imparts outward sliding movement to the brake shoes 14 in opposite directions, thus causing the brake lining material 36 to frictionally engage the brake drum 10. Upon the release of the brake actuating mechanism, the spring 20 slide the brake shoes to a retracted position and force the wedge member 22 upwardly to its normal position.

By reason of the construction and arrangement of the parts herein shown and described, it will be appreciated that the mechanism may be readily assembled and that the parts are accessible for repair or replacement purposes. In fact, the brakes may be relined by the use of the brake lining units 31 without the aid of a skilled mechanic.

Having thus described the invention, what I claim as new and desire to secure by Letters Patent of the United States, is:

In combination with a brake shoe having an arcuate shape flange and an integral web extending inwardly from the inner side thereof, a brake lining unit including an arcuate shape base member of a length approximating the length of said arcuate shape flange and conforming to the curvature thereof and disposed against the outside of said flange, preformed hook portions integral with the ends of said base member arranged in hooking engagement with the ends of said flange and having notches in their inner sides to accommodate said web, a boss extending outwardly from said web approximately midway between the ends of said brake shoe and having a threaded hole therein, an ear formed integral with said base member and extending inwardly from the outer side thereof and overlying said boss, a threaded bolt passing through said ear and threaded into said threaded hole, and a strip of friction lining material secured to and covering the outer side of said arcuate shape base member.

PETER RUFFINO.